United States Patent
Assier

[11] Patent Number: 5,466,408
[45] Date of Patent: Nov. 14, 1995

[54] PROCESS FOR THE MANUFACTURE OF A BASKET FOR DOMESTIC CENTRIFUGE

[75] Inventor: Michel R. M. Assier, Alencon, France

[73] Assignee: Moulinex (Societe Anonyme), Bagnolet, France

[21] Appl. No.: 117,705

[22] Filed: Sep. 8, 1993

Related U.S. Application Data

[62] Division of Ser. No. 71,388, Jun. 2, 1993, Pat. No. 5,386,926.

[30] Foreign Application Priority Data

Jun. 5, 1992 [FR] France ................ 92 06886

[51] Int. Cl.⁶ ........................................... B29C 45/14
[52] U.S. Cl. ............................ 264/156; 264/279
[58] Field of Search ........................ 264/153, 154, 264/156, 271.1, 279; 425/290; 55/DIG. 31

[56] References Cited

U.S. PATENT DOCUMENTS

| | | | |
|---|---|---|---|
| 3,145,904 | 8/1964 | Bromley | 55/DIG. 31 |
| 3,523,474 | 8/1970 | Kinslow, Jr. | 264/153 |
| 3,719,736 | 3/1973 | Woodruff | 264/156 |
| 4,090,310 | 5/1978 | Koff . | |
| 4,740,303 | 4/1988 | Greutert et al. | 210/498 |
| 4,882,055 | 11/1989 | Stamstad | 210/497.3 |
| 4,964,992 | 10/1990 | Goldsmith | 264/156 |
| 5,108,669 | 4/1992 | van Dijk et al. | 264/154 |
| 5,188,646 | 2/1993 | Nolen, Jr. | 55/DIG. 31 |
| 5,277,571 | 1/1994 | Brining | 425/290 |

FOREIGN PATENT DOCUMENTS

| | | |
|---|---|---|
| 0198289 | 10/1986 | European Pat. Off. . |
| 0301599 | 2/1989 | European Pat. Off. . |
| 3434687 | 4/1986 | Germany . |
| 384151 | 1/1965 | Switzerland . |
| 414077 | 12/1966 | Switzerland . |
| 2018170 | 10/1979 | United Kingdom . |

*Primary Examiner*—Robert B. Davis
*Attorney, Agent, or Firm*—Young & Thompson

[57] ABSTRACT

Basket for a domestic centrifuge has a screen (2) having a finely perforated surface of revolution and including two annular reinforcing rings (3 and 4) disposed on the circular borders (5, 6). The screen (2) is of plastic material and the fine perforations (7, 10, 10') obtained by a process of mechanical cutting out. Thus the fine perforations (7, 10, 10') can be obtained by punching, or by cutting with a laser beam. The fine perforations (7, 10, 10') have borders with sharp edges that are directed radially inwardly, to assist in juicing. The plastic material is a polyester. The screen (2) of polyester has a wall thickness of between 0.15 mm and 0.30 mm.

2 Claims, 3 Drawing Sheets

PROCESS FOR THE MANUFACTURE OF A BASKET FOR DOMESTIC CENTRIFUGE

This application is a division of application Ser. No. 08/071,388, filed Jun. 2, 1993, now U.S. Pat. No. 5,386,926.

FIELD OF THE INVENTION

The invention relates to centrifuges for fresh juice which comprise a motor driving in rotation at high speed a basket constituted by a screen having a finely perforated surface of revolution and comprising two annular reinforcing rings disposed on its circular edges.

BACKGROUND OF THE INVENTION

In known centrifuges of this type, the screen is made either from a perforated metal plate of nickel, cut out, shaped and maintained in this shape by welding, or by electrolytic deposit of nickel directly on its surface of revolution.

In mass production of for example several hundreds of thousands of filters, the use of nickel, particularly because of its cost, requires the manufacturer to produce the screens with minimum thickness compatible however with good mechanical strength in rotation. Despite that, the screens remain fragile and their handling in the factory is very delicate particularly during operations of molding the rings, giving rise to considerable scrap. Moreover, because of the small thickness of the screen, the user during cleaning the basket can tear or dent the screen thereby rendering it unusable.

The invention has for its object to overcome these drawbacks.

SUMMARY OF THE INVENTION

According to the invention, the screen is of a plastic material and the fine perforations are obtained by an operation of mechanical cutting.

It will be understood that, thanks to a screen of plastic material, the cost of fabrication and the sales price of the baskets are very much lower than those baskets with nickel screens, and the scrap is practically nothing. Moreover, the cleaning by the user of these baskets does not harm them.

BRIEF DESCRIPTION OF THE DRAWINGS

The characteristics and advantages of the invention will become more apparent from the description which follows, by way of example, with reference to the accompanying drawings, in which.

DETAILED DESCRIPTION OF THE INVENTION

Figure 1:
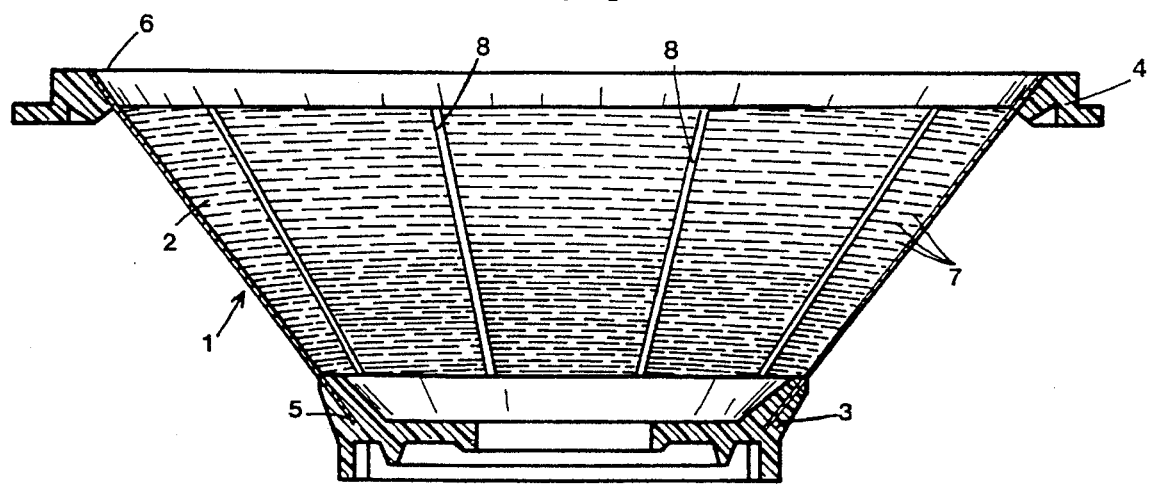
FIG. 1 is a vertical cross section of a centrifuge basket comprising a screen according to the invention produced according to a first embodiment.

As shown in FIG. 1, the centrifuge basket 1 comprises a screen 2 having a truncated conical surface of revolution finely perforated and comprising two annular reinforcing rings 3 and 4 disposed respectively on the small and large circular margins 5 and 6.

According to the invention, the screen 2 is produced of plastic material and the fine perforations 7 are obtained by an operation of mechanical cutting out. This mechanical cutting out can be done by a laser beam or preferably by piercing by means of a tool comprising punches and a matrix having imprints corresponding to the punches (not shown in the drawing).

So as to guarantee good mechanical strength to the screen, the plastic material is a polyester and has a wall thickness of the order of 0.15 mm to 0.30 mm and preferably equal to 0.25 mm.

The screen 2, without perforation, can be obtained either directly in one molded piece in truncated conical form, or in a molded piece in the form of a sector, or by cutting out from a strip of polyester as will be explained hereinafter with reference to FIGS. 2 and 3.

Each perforation 7 has an oblong shape whose width is of the order of 0.4 mm and whose length, as a function of the choice of distribution of the perforations over the surface of the screen, is comprised between 2 and 3 mm. Thanks to the punching, the perforations 7 have borders with sharp edges which improve the extraction of the juice by acting as razors on the centrifuged pulp.

According to a first embodiment of manufacture shown in FIG. 1, the perforations 7 are provided over all the surface of the screen in rows parallel to the circular edges 5 and 6 and according to a distribution permitting their offsetting between successive rows.

So as to reinforce the screen 2, it is possible to mold the reinforcing rings 3 and 4 along with transverse ribs 8 which extend along generatrices and which are established among the perforations 7.

Figure 3:
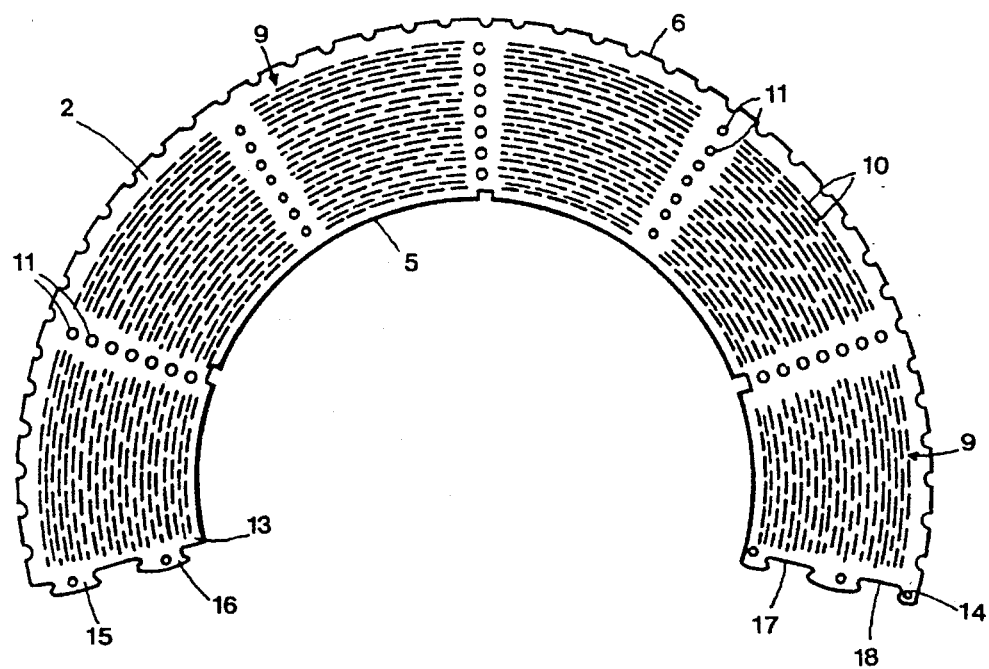
FIG. 3 is a plan view showing the screen shaped from the band of plastic material of FIG. 2.

According to a second embodiment of manufacture, shown particularly in FIG. 3, the screen 2 is divided in several sectors 9 each of which has perforations 10 and which are separated by strips free from perforation extending along generatrices and having anchoring openings 11 adapted to receive the ribs 8 of plastic material which are molded with the reinforcing rings 3 and 4.

Figure 4:
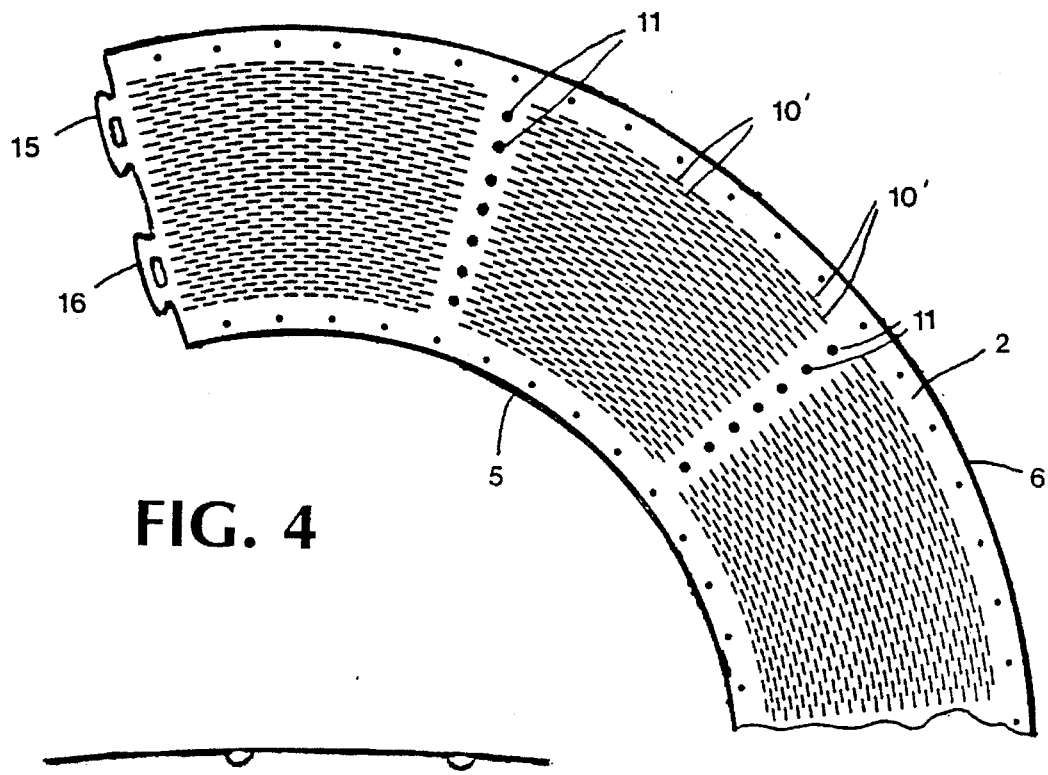
FIG. 4 is a view on a larger scale of a screen according to the invention produced according to a third embodiment of manufacture.
Figure 5:
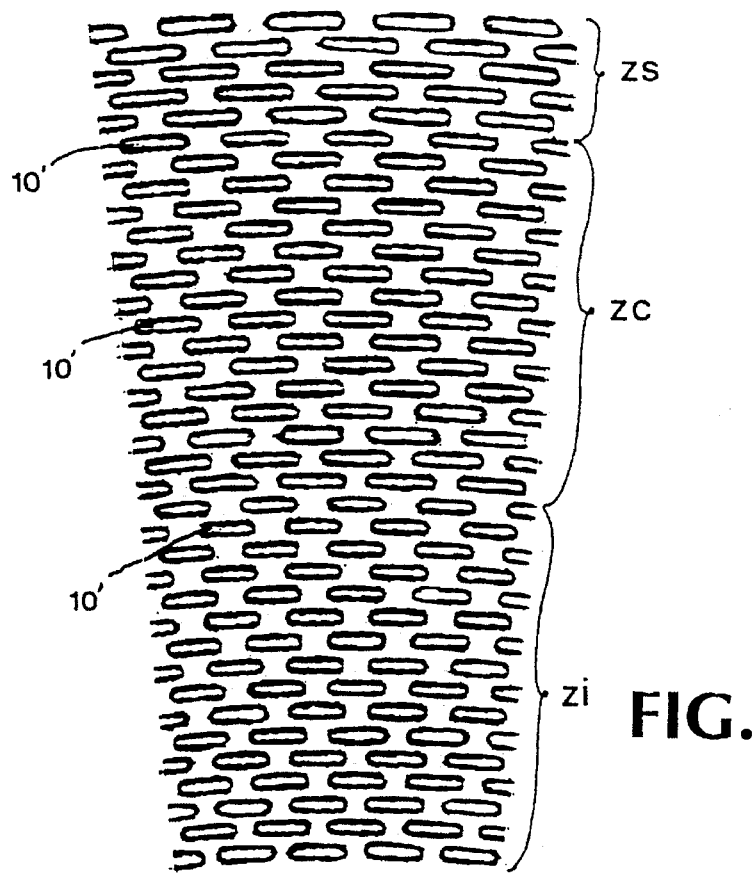
FIG. 5 is an enlarged view of a portion of the screen of FIG. 4 showing the perforations of this screen.

So as to guarantee a certain mechanical rigidity of the screen to avoid tearing of the sheet in the course of the operation of cutting out by punching, there is adopted a distribution of the perforations such as represented in FIG. 4. Thus, in this third preferred embodiment of manufacture and as is better shown in FIG. 5, the perforations 10' are arranged staggered with a slight offset between themselves and form columns oriented according to the generatrices. Moreover, so as to maintain a certain minimal surface between the perforations 10' and to obtain the same number of perforations not only in the rows of the lower zones $Z_i$ but also intermediate zones $Z_c$ and upper zones $Z_s$ of the truncated cone, the length of the perforations is different and is in this embodiment equal to 2 mm for the lower zone $Z_i$, 2.4 mm for the central zone $Z_c$ and 2.8 mm for the upper zone $Z_s$.

Figure 2:
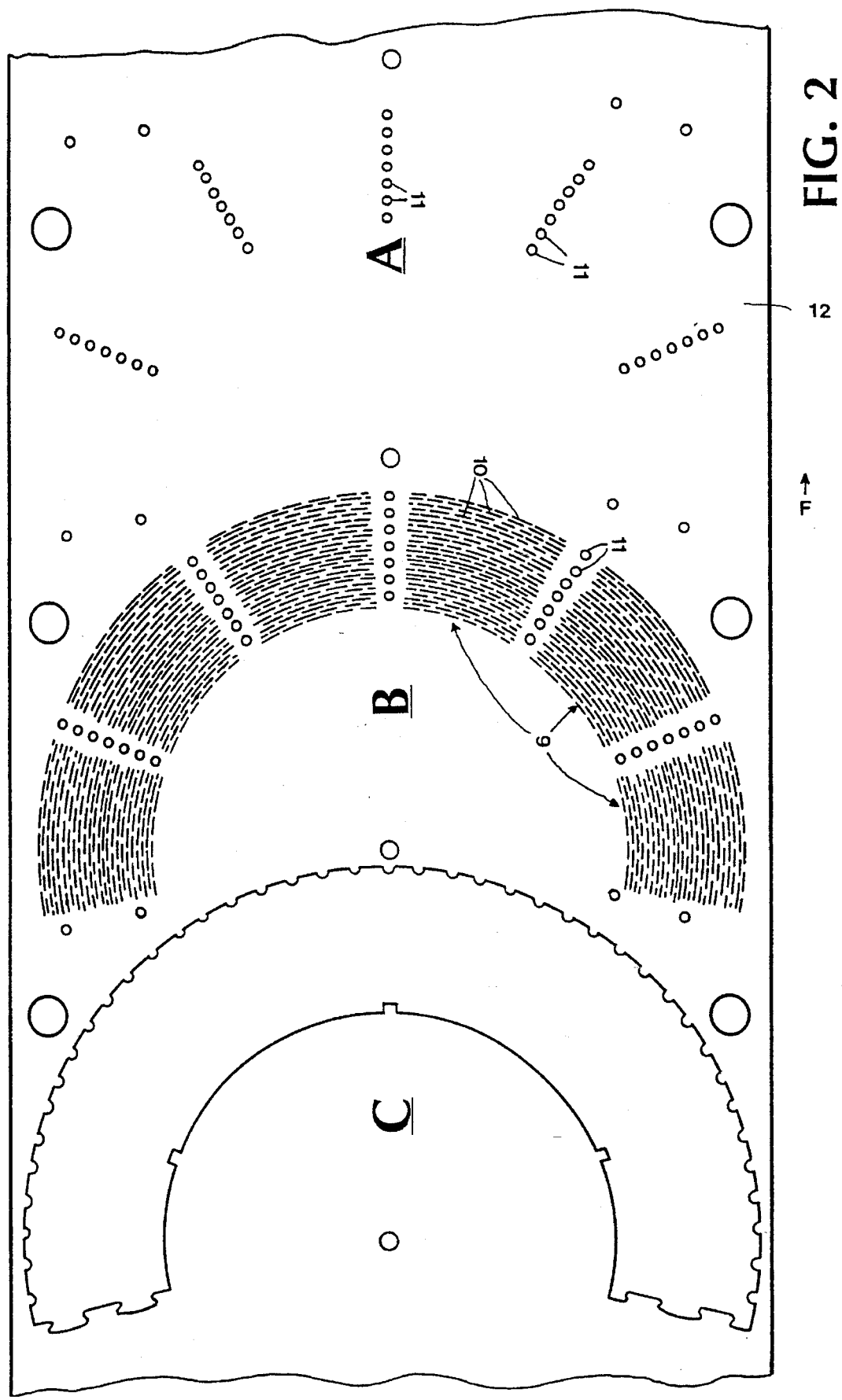
FIG. 2 shows on a smaller scale a strip of plastic material in which is shown the different operations of the process of production of a screen according to the invention and according to a second embodiment of manufacture.

With reference to FIGS. 2 and 3, there will now be explained the process for production of the screen 2. There is used a strip 12 of plastic material such as polyester which is caused to move lengthwise according to a certain longitudinal interval (arrow F) to different machining stations (not shown). In a first station A, the strip 12 is perforated to provide the anchoring holes 11. In a second station B, the strip is punched to provide the perforations 10. This punching operation can be effected either at a single time by means of a tool comprising as many punches as perforations, or by several passes by means of a tool or several tools comprising respectively two rows of punches and movably mounted on a support (not shown) which is driven sequentially in rotation and which sweeps angularly, from one end to the other of the screen, the sectors 9 to be perforated. The direction of this sequential rotation is controlled by a programmable computer. In a third station C, the screen 2 is precisely sized by providing in the ends 13 and 14 tenons 15–16 and mortises 17–18 (see FIG. 3) which will constitute a mutual interlocking device for the ends 13 and 14 to maintain the sector of screen 2 in truncated conical shape. Then screen 2 thus shaped is conveyed to a molding station so as to form the rings 3 and 4 as well as the ribs 8.

Thanks to this process of fabrication, there is provided a mass production of screens with practically no scrap because the stamping takes place in a precise and clean manner along the strip of plastic material which moves lengthwise between the matrices and the punches. Moreover, the screen once shaped as a truncated cone and molded, acquires a high mechanical resistance permitting its use without particular precautions.

What is claimed is:

1. Process for the production of a basket for a domestic centrifuge, which comprises:

providing a strip of plastic material having a surface;

displacing said strip by a certain longitudinal interval to different machining stations;

perforating said strip in a first station to provide anchoring holes;

punching the strip in a second station to provide perforations, said step of punching being carried out by a tool comprising at least two rows of punchers and driven sequentially so as to sweep the surface to be perforated;

precisely cutting out a screen in a third station by providing in ends of the screen tenons and mortices to constitute a mutual interlocking device;

maintaining the screen in its shape of revolution via said mutual interlocking device; and thereafter molding rings and ribs on the screen.

2. Process according to claim 1, wherein the tool used to punch the strip is movably mounted on a support, and said support is driven sequentially in rotation so as to sweep angularly the surface to be perforated.

* * * * *